(12) United States Patent
Hsu et al.

(10) Patent No.: US 11,516,599 B2
(45) Date of Patent: Nov. 29, 2022

(54) PERSONAL HEARING DEVICE, EXTERNAL ACOUSTIC PROCESSING DEVICE AND ASSOCIATED COMPUTER PROGRAM PRODUCT

(71) Applicant: RELAJET TECH (TAIWAN) CO., LTD., Taipei (TW)

(72) Inventors: Yun-Shu Hsu, Taipei (TW); Po-Ju Chen, Taipei (TW)

(73) Assignee: RELAJET TECH (TAIWAN) CO., LTD., Taipei (TW)

( * ) Notice: Subject to any disclaimer, the term of this patent is extended or adjusted under 35 U.S.C. 154(b) by 0 days.

(21) Appl. No.: 17/059,188

(22) PCT Filed: May 28, 2019

(86) PCT No.: PCT/CN2019/088748
§ 371 (c)(1),
(2) Date: Nov. 25, 2020

(87) PCT Pub. No.: WO2019/228329
PCT Pub. Date: Dec. 5, 2019

(65) Prior Publication Data
US 2021/0211812 A1 Jul. 8, 2021

(30) Foreign Application Priority Data

May 29, 2018 (CN) .......................... 201810530623.8

(51) Int. Cl.
*H04R 25/00* (2006.01)

(52) U.S. Cl.
CPC ........... *H04R 25/453* (2013.01); *H04R 25/43* (2013.01)

(58) Field of Classification Search
CPC ....... H04R 25/00; H04R 25/55; H04R 25/558
See application file for complete search history.

(56) References Cited

U.S. PATENT DOCUMENTS

| 5,473,759 A | 12/1995 | Slaney et al. |
| 5,850,627 A | 12/1998 | Gould et al. |

(Continued)

FOREIGN PATENT DOCUMENTS

| CN | 104936091 | 9/2015 |
| CN | 106385658 | 2/2017 |

(Continued)

*Primary Examiner* — Suhan Ni
(74) *Attorney, Agent, or Firm* — Liu & Liu

(57) ABSTRACT

Disclosed is a personal hearing device, an external acoustic processing device and an associated computer program product. The personal hearing device includes:
 a microphone, for receiving an input acoustic signal, wherein the input acoustic signal is a mixture of sounds coming from a first acoustic source and from other acoustic source(s);
 a speaker; and
 an acoustic processing circuit, for automatically distinguishing within the input acoustic signal the sound of the first acoustic source from the sound of other acoustic source(s);
 wherein the acoustic processing circuit further processes the input acoustic signal by having different modifications to the sound of the first acoustic source and to the sound of other acoustic source(s), whereby the acoustic processing circuit produces an output acoustic signal to be played on the speaker.

18 Claims, 3 Drawing Sheets

(56) References Cited

U.S. PATENT DOCUMENTS

| | | | |
|---|---|---|---|
| 8,036,891 B2 | 10/2011 | Fulop | |
| 8,965,016 B1 | 2/2015 | Howes | |
| 9,691,377 B2 | 6/2017 | Gunn et al. | |
| 2011/0237295 A1 | 9/2011 | Bartkowiak et al. | |
| 2012/0252411 A1* | 10/2012 | Johnsgard | H04M 1/67 |
| | | | 455/411 |
| 2014/0023219 A1 | 1/2014 | Chao et al. | |
| 2018/0109889 A1* | 4/2018 | Kang | H04R 25/558 |
| 2018/0115840 A1 | 4/2018 | Tu et al. | |
| 2020/0184845 A1* | 6/2020 | Tanaka | G06V 30/40 |

FOREIGN PATENT DOCUMENTS

| | | |
|---|---|---|
| CN | 107105367 A | 8/2017 |
| CN | 107799117 | 3/2018 |
| CN | 107105367 B | 7/2020 |

\* cited by examiner

PERSONAL HEARING DEVICE, EXTERNAL ACOUSTIC PROCESSING DEVICE AND ASSOCIATED COMPUTER PROGRAM PRODUCT

BACKGROUND OF THE INVENTION

Field of the Invention

The present invention relates a personal hearing device, and more particularly, to a personal hearing device capable of detecting acoustic information needing user attention and performing appropriate processing according to hearing requirements of a user.

Description of the Prior Art

Conventional personal hearing devices, such as digital hearing aids, can perform gain compensation of individually different frequencies with respect to hearing attenuation curves of users. Other conventional personal hearing devices, for example, active anti-noise earphones, in order to allow a user to hear human sounds in an external environment in addition to music, noise reduction can also be performed with respect to only specific frequency components (for example, 100 Hz to 1 kHz noise of the environment and vehicles).

Other prior arts related to personal hearing aids can be referred from the U.S. Patent Publication No. 2018/0115840, U.S. Patent Publication No. 2014/0023219 and U.S. Pat. No. 8,965,016.

SUMMARY OF THE INVENTION

The present invention acknowledges that most sounds in real life are meaningless to a user. For example, noise from vehicles and sounds of conversion of strangers in general is information irrelevant to a user or is not information of user interest. In other words, most sounds are not the so-called acoustic information needing user attention as mentioned in the present invention. On the other hand, for example, noise reduction earphones of the prior arts perform filtering with respect to frequency bands in which noise of vehicles is distributed, that is, sounds of conversion of strangers cannot be filtered out. However, if frequency bands of human voice are filtered, sounds of conversation of relatives or friends would also be filtered out, which is obviously not an ideal outcome.

Thus, the present invention acknowledges that, personal hearing devices of the prior art are incapable of determining within sounds received from an external environment whether acoustic information needing user attention is included therein. Conversely, even if the external environmental sounds do not altogether come from one single source, the conventional approach of the prior art regards and processes or optimizes the sounds (that is, sounds in fact coming from different sources and having been mixed) received externally as a whole, for example, filtering out all components of a specific band or a specific frequency from the mixed sounds received. However, such approach does not process in particular the individual acoustic information needing user attention, and so acoustic information intended to be heard by the user becomes distorted although components of the overall frequency can be filtered. That is, for example, if sounds of conversation of strangers are filtered using frequency bands in which human voice is distributed, sounds of conversation of acquaintances and friends would also be affected. Particularly for users with hearing challenges, such situation causes complications in the daily life.

In view of the above, a personal hearing device is provided according to an aspect of the present invention. The personal hearing device is capable of automatically detecting user-relevant acoustic information or acoustic information of user interest, which is then processed appropriately according to user requirements and then played to the user. The approach of the present invention can preserve the integrity of acoustic information, and can thus minimize distortion of the acoustic information.

With respect to the approach of determining whether sounds received from an external environment may contain user-relevant information, one approach of the present invention employs voiceprint analysis. For example, it is determined whether sounds contain a specific term (for example, the name of the user) by voiceprint analysis. Alternatively, it is determined whether voiceprint characteristics for identifying a specific acoustic source are contained. The specific acoustic source can be, for example, a user-predetermined relative or friend, or a specific device (for example, a fire alarm). It is understandable that the sounds coming from a relative or friend or a fire alarm are generally acoustic information needing user attention or reaction.

From another perspective, compared to the prior art, the personal hearing device set forth by the present invention distinguishes the sounds received according to acoustic sources but not purely according to frequency bands, so that the sounds coming from individual sources can be identified and extracted for independent processing or optimization. Thus, the acoustic source can be identified by means of voiceprint characteristics, and the acoustic source can also be identified by means of orientations of sounds. In addition, other approaches capable of identifying individual acoustic sources are also encompassed within the scope of the present invention.

A personal hearing device according to an embodiment of the present invention includes: a microphone, for receiving an acoustic input signal, which is a mixture of sounds coming from a first acoustic source and sounds coming from a second acoustic source; a speaker; and an acoustic processing circuit, for automatically distinguishing within the acoustic input signal the sounds coming from the first acoustic source, the acoustic processing circuit further processing the acoustic input signal by adjusting differently the sounds coming from the first acoustic source from the sounds other than the sounds coming from the first acoustic source, thereby generating an acoustic output signal to be played on the speaker for a user.

A personal hearing device is provided according to another embodiment of the present invention. The personal hearing device includes: a microphone, for receiving an acoustic input signal, which is a mixture of sounds coming from a first acoustic source and sounds coming from a second acoustic source; a speaker; and an acoustic processing circuit, for automatically distinguishing the first acoustic source from another acoustic source (for example, the second acoustic source), the acoustic processing circuit further processing the acoustic input signal to adjust differently the sounds coming from the first acoustic source from sounds other than the sounds coming from the first acoustic source, thereby generating an acoustic output signal to be played on the speaker for a user.

A personal hearing device is provided according to another embodiment of the present invention. The personal hearing device is wirelessly connected to an external acoustic processing device, and includes: a microphone, for receiving an acoustic input signal, which is a mixture of sounds coming from a first acoustic source and sounds coming from a second acoustic source; a speaker; and a communication circuit, for wirelessly transmitting the acoustic input signal to the external acoustic processing device, the external acoustic processing circuit automatically distinguishing within the acoustic input signal the sounds coming from the first acoustic source. The external acoustic processing device further processes the acoustic input signal to adjust differently the sounds coming from the first acoustic source from sounds other than the sounds coming from the first acoustic source, thereby generating an acoustic output signal that is received by the communication circuit and played on the speaker for a user.

In other embodiments, the present invention further provides an acoustic processing device that is wireless connected to the foregoing personal hearing device and provides collaborations as required. Moreover, the present invention further provides a computer program product executable on the foregoing external acoustic processing device so as to provide collaborations needed by the foregoing personal hearing device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
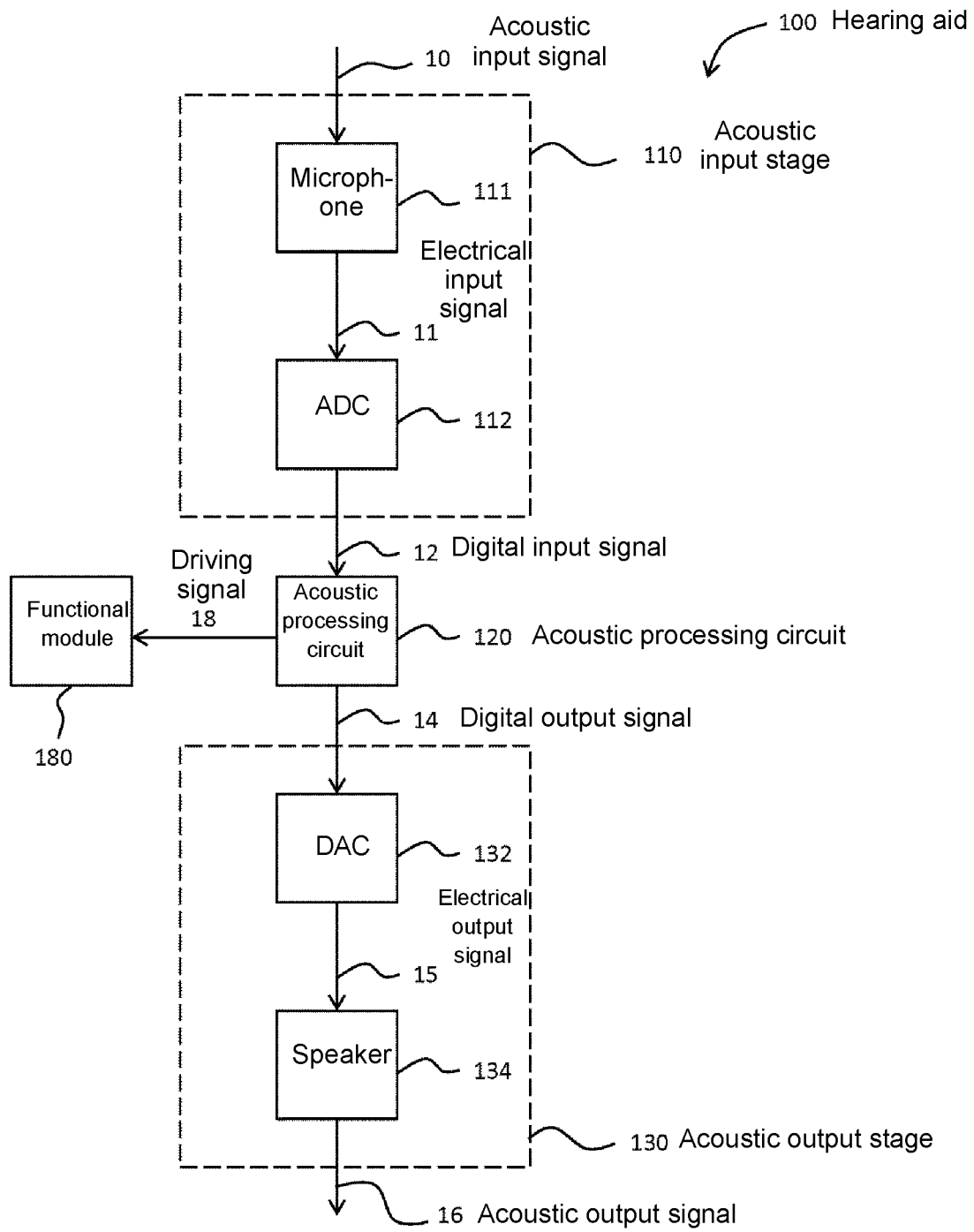
FIG. 1 is a personal hearing device according to a specific embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
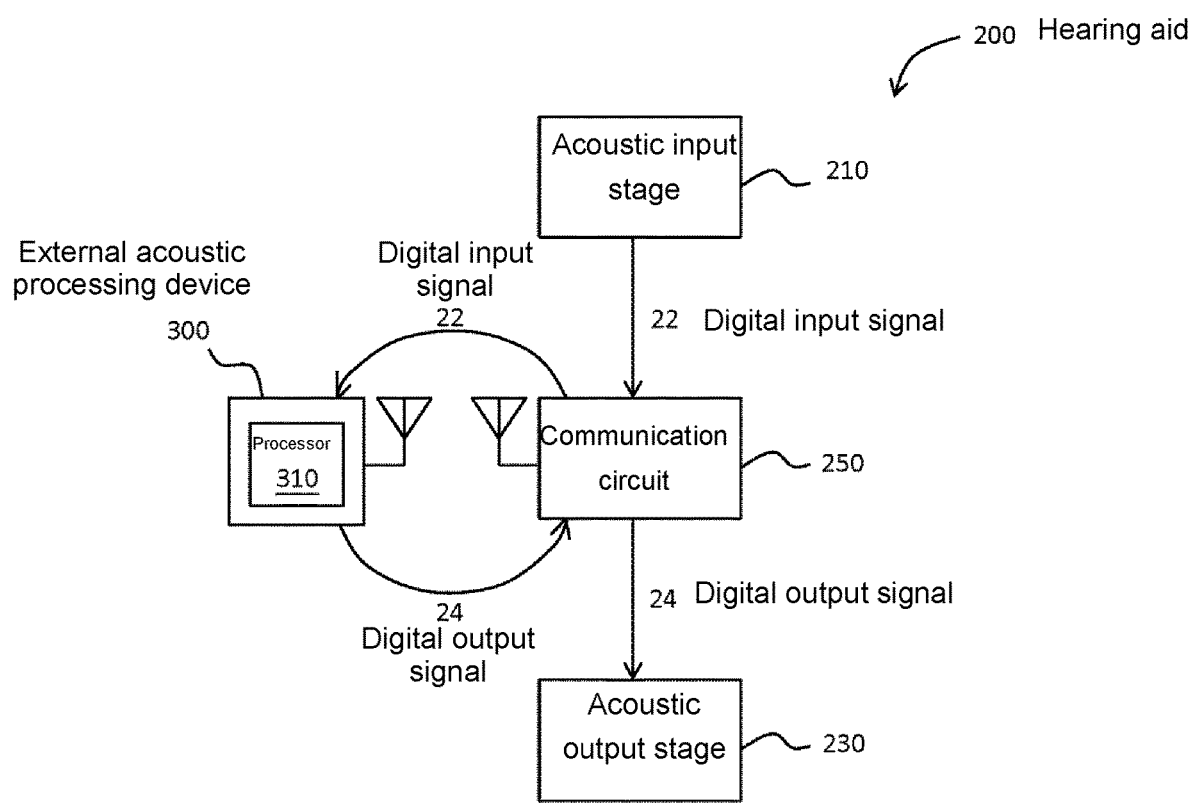
FIG. 2 is a personal hearing device according to another embodiment of the present invention.
Figure 3:
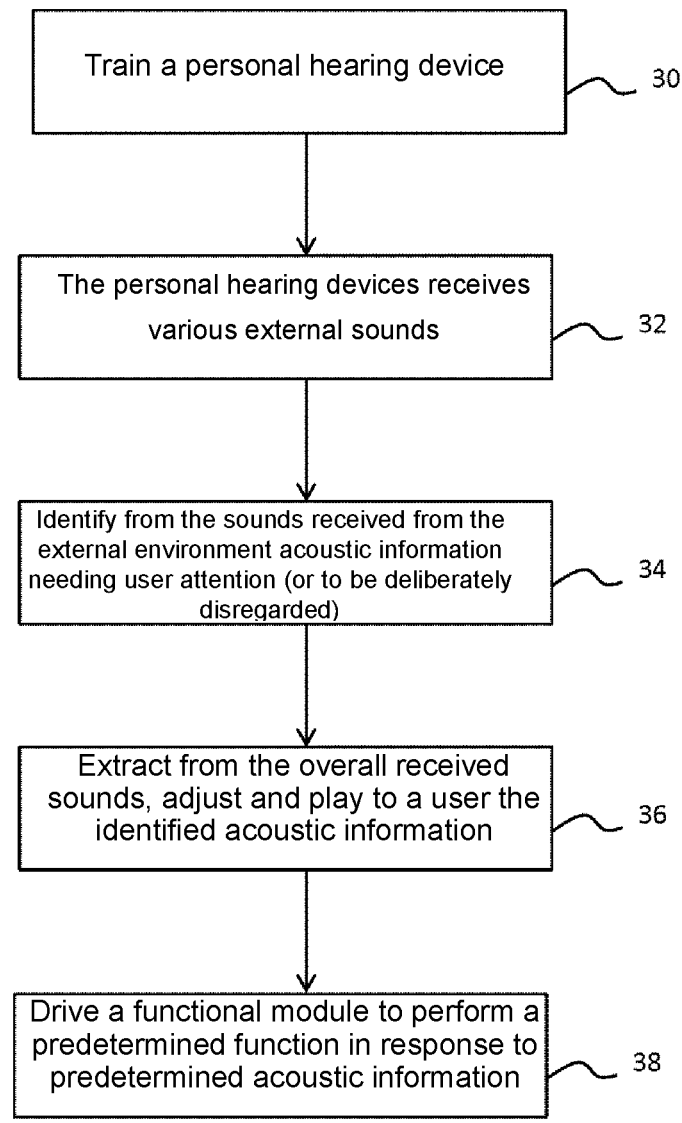
FIG. 3 is an exemplary application scenario according to a specific embodiment of the present invention.

Referring now to FIG. 1 through FIG. 3, computer devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<Personal Hearing Device>

A hearing aid is given as an example for explaining the personal hearing device of the present invention. However, it should be noted that the present invention is not limited to being a hearing aid used by the hearing impaired. For example, the personal hearing device of the present invention can also be implemented as earphones used in specific sound environments, or earphones commonly used in transportation means.

FIG. 1 shows a block diagram of a hearing aid 100 according to an embodiment. In this embodiment, the hearing aid 100 includes an acoustic input stage 110, an acoustic processing circuit 120, and an acoustic output stage 130. The acoustic input stage 110 includes a microphone 111 and an analog-to-digital converter (ADC) 112. The microphone 111 is for receiving an acoustic input signal 10 (for example, an analog acoustic signal), and converting the acoustic input signal 10 to an electrical input signal 11. The ADC 112 converts the electrical input signal 11 to a digital input signal 12 as an input to the acoustic processing circuit 120. Moreover, the microphone 111 can be built-in or external.

The acoustic processing circuit 120 performs acoustic processing of the digital input signal 12 to generate a digital output signal 14, with details of the processing to be described in detail shortly. In some embodiments, the acoustic processing circuit 120 can be a microcontroller, a processor, a digital signal processor (DSP) or an application-specific integrated circuit (ASIC); however, the present invention is not limited to the above.

The acoustic output stage 130 includes, for example, a digital-to-analog-converter (DAC) 132 and a speaker 134. The DAC 132 converts the digital output signal generated by the acoustic processing circuit 120 to an electrical output signal 15. The speaker (or referred to as a receiver) 134 converts the electrical output signal 15 to an acoustic output signal 16 (for example, an analog acoustic signal) and plays the acoustic output signal 16 for the user to hear.

Parts the hearing aid 100 that are not directly associated with present invention can be referred from existing digital hearing aids, for example, digital hearing aid products manufactured by GN Hearing A/S or Interton, and the associated details are omitted herein.

FIG. 2 shows a block diagram of a hearing aid 200 according to another embodiment. Same as the hearing aid 100 in FIG. 1, the hearing aid 200 similarly includes an acoustic input stage 210 and an acoustic output stage 230, which are fundamentally similar to the acoustic input stage 110 and the acoustic output stage 130 in FIG. 1, and associated details are omitted herein. The hearing aid 200 primarily differs from the hearing aid 100 in FIG. 1 in that, the acoustic processing circuit 120 in the hearing aid 100 is omitted from the hearing aid 200, and the hearing aid 200 includes a communication circuit 250. Thus, a digital input signal 22 generated by the acoustic input stage 210 can be transmitted through wireless communication to an external acoustic processing device 300 for processing.

Same as the acoustic processing circuit 120 in FIG. 1, the external acoustic processing device 300 can generate a digital output signal 24, and further returns the digital output signal 24 through wireless communication to the acoustic output stage 230 of the hearing aid 200.

Moreover, it should be noted that the wireless communication means between the hearing aid 200 and the external acoustic processing device 300 is not specifically defined, and can be implemented by, for example, Bluetooth, infrared or Wi-Fi. Meanwhile, the communication between the hearing aid 200 and the external acoustic processing device 300 is not limited to being direct peer-to-peer communication, and can be implemented by LAN, mobile phone networks or the Internet in some embodiments.

The external acoustic processing device 300 can be, for example, an exclusive acoustic processing device, which includes a customized microprocessor 310 or application-specific integrated circuit (ASIC). Alternatively, preferably, the external acoustic processing device 300 can be implemented by an existing smartphone (for example, iPhone of Apple). The processor 310 in the smartphone can implement the required acoustic processing function (with details to be described shortly) by executing a built-in application of the operating system or an additionally downloaded application. In other embodiments, the external acoustic processing device 300 can be implemented by a personal computer or a server configured at a cloud terminal. In other words, the external acoustic processing device 300 can be implemented by any device having an acoustic processing capability and capable of wirelessly communicating with the hearing aid 200.

It should be noted that, the approaches in FIG. 1 and FIG. 2 are non-conflicting, and the two may be implemented in combination.

<Acoustic Processing>

Acoustic processing performed by the acoustic processing circuit 120 in FIG. 1 or the external acoustic processing device 300 in FIG. 2 is described below. The acoustic processing of the present invention can be divided into an identification phase and an adjustment phase, which are individually described in detailed below.

Identification Phase

The approach for determining whether sounds received from an external environment contain user-relevant information can be divided into two categories respectively employing voiceprint analysis and non-voiceprint analysis.

In one embodiment employing voiceprint analysis, sounds are converted to spectral voiceprint, and identification is performed according to voiceprint characteristics. Particularly with respect to sounds of voice of people, due to differences in the sizes of vocal organs and the way of use of muscles of individuals, the voice of each individual has uniquely recognizable voiceprint characteristics. The voiceprint recognition technology is current a mature technology, and can be referred from the U.S. Pat. No. 8,036,891. Moreover, industry standards are set for voiceprint recognition in China, for example, «Technical Specification for Automatic Voiceprint Recognition (Speaking Personal Recognition)» (Serial No.: SJ/T11380.2008), and «Technical Requirements and Test Methods for Security Voiceprint Confirmation Application Algorithms» (Serial No.: GA/T 1179-2014), and associated details omitted herein. In general, the speaking person voiceprint recognition technology is capable of distinguishing voice from environmental noise first, and the voice is then recognized. It should be noted that, if specific acoustic information in voiceprint data needs to restored, extracted or separated later so as to carry out individual adjustment, preferably, an appropriate voiceprint characteristics analysis algorithm is used, for example, short-time Fourier transform (STFT), which can be referred to the U.S. Pat. No. 5,473,759.

In the foregoing embodiments, identification is performed using unique voiceprint characteristics of a speaking person. In comparison, in another embodiment using voiceprint analysis, identification is performed according to voiceprint characteristics of specific terms or voice segments (for example, ringtones of one's cellphone or a fire alarm). This part also belongs to a mature technology, and for example, reference can be made to voice-to-text input of the prior art. However, similarly, if specific acoustic information in voiceprint data needs to restored, extracted or separated later so as to carry out individual adjustment, preferably, an appropriate voiceprint characteristics analysis algorithm is used, preferably STFT.

Moreover, before voiceprint analysis is performed, an algorithm for voiceprint analysis needs to be trained. Commonly used training methods can be applied in the present application, and reference can be made to, for example, the U.S. Pat. Nos. 5,850,627 and the 9,691,377. It should be noted that, with respect to identification performed according to voiceprint characteristics of specific terms or voice segments (for example, a fire alarm), a universal sample can be used for training and a sample provided by a user is not mandatory. However, if the approach of performing identification using unique voiceprint characteristics of a speaking person instead of specific terms is used, due to different targets to be identified, training can only be performed using samples provided by a user. Nonetheless, it is not easy for a user using a common hearing aid to accumulate a large number of samples with respect to relevant speaking persons (for example, relatives and friends), and thus the approach of training using one-shot learning is preferred since only a small amount of speaking samples need to be collected for carrying out identification.

On the other hand, the approach of non-voiceprint analysis means that the unique characteristics of an acoustic source are not identified from the voiceprint or frequency component analysis for identification, wherein the unique characteristics can be sound-relevant or sound-irrelevant. In one non-voiceprint analysis but sound-relevant embodiment, different acoustic sources are identified according to orientations of sounds coming from the acoustic sources. In this embodiment, as shown in FIG. 1, the microphone 111 may have left and right sound channels, and thus the orientations of sounds can be positions according to a difference between timings at which the same sound is received by the left and right channels (however, voiceprint can still be used to determine whether the sounds received are from the same acoustic source). Positioning an acoustic source by means of a time difference is also a mature technology, and associated details are omitted herein. In addition, if a camera lens (not shown) is provided, the orientations of sounds can also be positioned using image identification.

It should be noted that, the various approaches of voiceprint analysis do not conflict the approaches of non-voiceprint analysis, and two types can be used in combination.

Adjustment Phase

Once whether the sounds received from the external environment contain user-relevant information (or contain acoustic information needing user attention) has been determined, the next phase of the acoustic processing is extracting the identified acoustic information from the overall received sounds and performing individual adjustment so as to meet hearing requirements of the user. In one embodiment, the volume of the identified and extracted acoustic information is increased, or sounds other than the identified acoustic information is reduced or filtered out. However, for specific requirements, such as deliberately disregarding specific acoustic information, the volume of the identified acoustic information can also be reduced or filtered out, or sounds other than the identified acoustic information can be increased. Apart from the volume, the frequency of the identified and extracted acoustic information can also be adjusted (that is, frequency shifting); for example, a higher pitch of a speaking person is down-converted to a lower pitch, whereas original frequencies are kept for other sounds.

In addition, the adjustment of acoustic information can also be different according to an identification result. For example, if the ringtone of the cellphone of the user is identified, the volume of the ringtone of the cellphone of the user can be increased; however, if the ringtone of a landline phone of a colleague sitting nearby is identified, the volume of the ringtone of the landline phone is reduced to filtered out.

Alternatively, in another example, the adjustment of the acoustic information can be made in different modes, and a user can switch between the different modes as desired by means of an instruction. For example, in one mode, upon identifying that the acoustic information is from friend A, the volume of the acoustic information of friend A is increased; however, if it is identified that the acoustic information is from colleague B, the volume of the acoustic information from colleague B is reduced or filtered out. When the user switches to another mode, the volume of the acoustic information of friend A is reduced or filtered out if the identified acoustic information is from friend A; however, the volume of the acoustic information of colleague B is increased if the identified acoustic information is from colleague B.

<Application Flow>

FIG. 3 shows a flowchart of an exemplary embodiment of the present invention, and the present invention is described also with reference to the personal hearing device in FIG. 1 or FIG. 2.

Step 30: an algorithm used for acoustic processing in the personal hearing device is trained, that is, providing the personal hearing device with the capability of identifying acoustic information. For identification that does not involve personalized acoustic information, the training part can be completed when the personal hearing device is shipped out of the factory. However, in some situations, particularly for performing identification of personalized acoustic information, the user still needs to provide acoustic samples for training of the personal hearing device.

Step 32: external sounds are received by the personal hearing device. In a normal situation, the external environment is filled with various acoustic sources, and numerous sounds coming from these acoustic sources are altogether received by a microphone of the personal hearing device.

In step 34: it is determined by the acoustic processing circuit 120 in FIG. 1 or the external acoustic processing device 300 in FIG. 3 whether the sounds received from the external environment contain acoustic information needing user attention (or to be deliberately disregarded). Details of the determination can be referred from the description of the foregoing identification phase. In brief, apart from determining according to voiceprint characteristics of specific terms or voice segments (for example, the ringtone of one's cellphone or a fire alarm) whether acoustic information needing user attention is present, the determination can also be performed by identifying the orientation of the acoustic source, and such identification can be performed by the unique voiceprint characteristics of the acoustic source or the orientation of the acoustic source. For example, sounds coming from relatives or friends are mostly acoustic information needing user attention, or sounds coming from a speaking person in front of the user are in general acoustic information needing user attention or user reaction. In addition, during use, the sounds received from the external environment may contain multiple sets of acoustic information needing user attention, and so priorities can be set accordingly for the acoustic information or the acoustic sources. Thus, the identified acoustic information having a lower priority can be disregarded and subsequent step 36 or 38 is omitted. However, in other embodiments, subsequent step 36 or 38 can also be performed for multiple sets of acoustic information identified.

In step S36, once the acoustic information needing user attention (or to be deliberately disregarded) has been identified, this step extracts from the overall received sounds and adjusts the acoustic information, for example, increasing or reducing the volume compared to other non-extracted sounds, or even filtering out the acoustic information and then playing the acoustic information for a user to hear. For example, when a user has a conversation with a number of people, the sounds of the voice of the user's own can be extracted and the volume can be reduced, so as to prevent interference with the user listening to sounds coming from other people. The associated details can be referred from the description of the foregoing adjustment phase. It should be noted that, in another embodiment, the user can switch between different adjustment modes by means of an instruction to adjust the different acoustic information identified, or to adjust the same acoustic information differently.

In step 38 (optional): the hearing aid 100 in FIG. 1 can further include a functional module 180 that is electrically connected to the acoustic processing circuit 120. Upon identifying whether the acoustic information needing user attention belongs to a user-predetermined acoustic source, the acoustic processing circuit 120 can further send a driving signal 18 to the functional module 180, so as to drive the functional module 180 to perform a predetermined function, preferably, for example but not limited to, a reminder for the user to pay attention. For example, the functional module 180 can include a vibrator (not shown), and the user specifies in advance by the acoustic processing circuit 120 a trigger condition as "family member C" or one's own name. Once the acoustic processing circuit 120 identifies the acoustic information of the family member C or identifies the user's name (that is, someone is calling the user), it sends the driving signal 18 to the functional module 180, and the functional module 180 can then generate a mild vibration to remind the user to pay attention. It should be noted that, in another embodiment, step 36 before step 38 can be omitted, that is, step 38 can be performed without first performing step 36.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

DESCRIPTION OF THE REFERENCE NUMBERS acoustic input signal 10
electrical input signal 11 digital input signal 12
digital output signal 14
electrical output signal 15
acoustic output signal 16
driving signal 18
digital input signal 22
digital output signal 24
hearing aid 100
acoustic input stage 110
microphone 111
analog-to-digital converter (ADC) 112 acoustic processing circuit 120
acoustic output stage 130
digital-to-analog-converter (DAC) 132
speaker 134
functional module 180
hearing aid 200
acoustic input stage 210
acoustic output stage 230
communication circuit 250
external acoustic processing device 300
processor 310

What is claimed is:

1. A personal hearing device for a hearing-impaired person, comprising:
   a microphone, for receiving an acoustic input signal, which includes a mixture of sound coming from a first acoustic source and sound coming from a second acoustic source;
   a speaker; and
   an acoustic processing circuit, for automatically identifying within the acoustic input signal the first acoustic source according to voiceprint recognition, and accordingly extracting, from the acoustic input signal including the mixture of sounds, the sound coming from the first acoustic source,
   wherein the acoustic processing circuit further processing the extracted sound by individually adjusting the sound coming from the first acoustic source differently from the sounds not coming from the first acoustic source, thereby generating an acoustic output signal to be played on the speaker for a user.

2. The personal hearing device according to claim 1, wherein the acoustic processing circuit processes the extracted sound by filtering out the sounds not coming from the first acoustic source.

3. The personal hearing device according to claim 1, wherein the acoustic processing circuit identifies the sound coming from the first acoustic source according to spectral voiceprints.

4. The personal hearing device according to claim 3, wherein the acoustic processing circuit further identifies the first acoustic source according to voiceprint characteristics of a speaking person.

5. The personal hearing device according to claim 3, wherein the acoustic processing circuit further determines whether the sound coming from the first acoustic source contain a specific term or a voice segment.

6. The personal hearing device according to claim 1, wherein the acoustic processing circuit processes the extracted sound by filtering out the sound coming from the first acoustic source.

7. The personal hearing device according to claim 1, wherein the acoustic processing circuit processes the extracted sound by increasing a volume of the sound coming from the first acoustic source relative to the sounds not coming from the first acoustic source.

8. The personal hearing device according to claim 1, wherein the acoustic processing circuit performs two or more different types of processing on the extracted sound, and switches between different processing modes in response to a user instruction.

9. The personal hearing device according to claim 1, further comprising a functional module; wherein, when the acoustic processing circuit issues, upon determining that the sounds coming from the first acoustic source satisfies a predetermined condition, a driving signal to the functional module to perform a predetermined function.

10. The personal hearing device according to claim 1, wherein the acoustic processing circuit also identify within the acoustic input signal the second acoustic source according to voiceprint recognition, and accordingly extracting, from the acoustic input signal including the mixture of sounds, the sound coming from the second acoustic source;
    wherein the acoustic processing circuit further processing the extracted sounds by individually adjusting the sound coming from the second acoustic source differently from the sounds not coming from the second acoustic source, thereby generating the acoustic output signal.

11. The personal hearing device according to claim 1, wherein the extracted sound and the remaining non-extracted sounds share a common frequency band.

12. The personal hearing device according to claim 1, wherein the extracted sound and the remaining non-extracted sounds share a common frequency band in which human voice is distributed.

13. A personal hearing device for a hearing-impaired person, wirelessly connected to an external acoustic processing device, the personal hearing device comprising:
    a microphone, for receiving an acoustic input signal, which includes a mixture of sounds coming from a first acoustic source and sounds coming from a second acoustic source;
    a speaker; and
    a communication circuit, for wirelessly transmitting the acoustic input signal to the external acoustic processing device, the external acoustic processing device automatically identifying within the acoustic input signal the first acoustic source according to voiceprint recognition and extracting, from the acoustic input signal including the mixture of sounds, the sound coming from the first acoustic source;
    wherein, the external acoustic processing device further processes the extracted sound by individually adjusting the sound coming from the first acoustic source differently from the sounds not coming from the first acoustic source, thereby generating an acoustic output signal to be received by the communication circuit and played on the speaker for a user.

14. An external acoustic processing device, wirelessly connected to the personal hearing device of claim 11, the external acoustic processing device comprising:
    a processor, automatically extracting from the acoustic input signal including the mixture of sounds, the sound coming from a first acoustic source, and processing the extracted sound by adjusting the sound coming from the first acoustic source differently from the sounds not coming from the first acoustic source, thereby generating an acoustic output signal to be provided to the personal hearing device.

15. A computer program product stored in a computer-usable medium, comprising a non-transitory computer-readable program provided and executable on the external acoustic processing device of claim 14 to automatically extract, from the acoustic input signal including the mixture of sounds, the sound coming from the first acoustic source, and process the extracted sound by adjusting the sound coming from the first acoustic source differently from the sounds not coming from the first acoustic source, thereby generate an acoustic output signal to be provided to the personal hearing device.

16. The personal hearing device according to claim 13, wherein the external acoustic processing circuit also extracts, from the acoustic input signal including the mixture of sounds, the sound coming from the second acoustic source;
> wherein the external acoustic processing device further processes the extracted sounds by individually adjusting the sound coming from the second acoustic source differently from the sounds not coming from the second acoustic source, thereby generating the acoustic output signal.

17. The personal hearing device according to claim 13, wherein the extracted sound and the remaining non-extracted sounds share a common frequency band.

18. The personal hearing device according to claim 13, wherein the extracted sound and the remaining non-extracted sounds share a common frequency band in which human voice is distributed.

* * * * *